(12) United States Patent
Gearhart et al.

(10) Patent No.: US 9,909,886 B2
(45) Date of Patent: *Mar. 6, 2018

(54) SYSTEMS AND METHODS FOR PROVIDING MAPPING SERVICES INCLUDING ROUTE BREAK POINT RECOMMENDATIONS

(71) Applicant: MapQuest, Inc., Denver, CO (US)

(72) Inventors: G. Duane Gearhart, Hummelstown, PA (US); Scott W. Steinke, Denver, CO (US)

(73) Assignee: Mapquest, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,656

(22) Filed: Feb. 26, 2016

(65) Prior Publication Data

US 2016/0178384 A1 Jun. 23, 2016

Related U.S. Application Data

(63) Continuation of application No. 13/966,047, filed on Aug. 13, 2013, now Pat. No. 9,304,007.

(51) Int. Cl.
| | |
|---|---|
| *G01C 21/00* | (2006.01) |
| *G01C 21/34* | (2006.01) |
| *G01C 21/36* | (2006.01) |
| *G01C 21/20* | (2006.01) |

(52) U.S. Cl.
CPC ........ *G01C 21/3407* (2013.01); *G01C 21/20* (2013.01); *G01C 21/343* (2013.01); *G01C 21/362* (2013.01); *G01C 21/3682* (2013.01)

(58) Field of Classification Search
None
See application file for complete search history.

(56) References Cited

U.S. PATENT DOCUMENTS

| | | | | |
|---|---|---|---|---|
| 6,009,403 A | * | 12/1999 | Sato | G01C 21/343 340/990 |
| 6,401,034 B1 | * | 6/2002 | Kaplan | G08G 1/0962 701/300 |
| 6,567,743 B1 | * | 5/2003 | Mueller | G01C 21/3446 701/467 |

(Continued)

OTHER PUBLICATIONS

International Search Report and Written Opinion for corresponding International Application No. PCT/US2014/048848, mailed on Oct. 9, 2014 (7 pages).

*Primary Examiner* — Bhavesh V Amin (57) ABSTRACT

Computer implemented methods are disclosed for providing geographical information to a user. One method may include receiving, from a user's electronic device and over a network, user input data including at least the destination location and a break point parameter and calculating one or more routes from the start location to the destination location, based on the user input data. The method may also include identifying one or more intermediate break point locations along the one or more routes based on the break point parameter received from the user and identifying a range extending around each intermediate break point location, and potential break points. A step may also be executed in which a density or type of points of interest within each potential break point may be evaluated by the electronic device and a recommended for a break point made.

19 Claims, 6 Drawing Sheets

(56) References Cited

U.S. PATENT DOCUMENTS

| | | | |
|---|---|---|---|
| 6,691,027 B1 * | 2/2004 | Tu | G01C 21/343 |
| | | | 701/533 |
| 6,996,469 B2 | 2/2006 | Lau et al. | |
| 7,064,681 B2 | 6/2006 | Horstemeyer | |
| 7,082,365 B2 | 7/2006 | Sheha et al. | |
| 7,135,992 B2 | 11/2006 | Karlsson et al. | |
| 7,145,478 B2 | 12/2006 | Goncalves et al. | |
| 7,321,826 B2 | 1/2008 | Sheha et al. | |
| 7,353,109 B2 | 4/2008 | Han | |
| 7,640,104 B2 * | 12/2009 | Ramaswamy | G01C 21/3679 |
| | | | 340/995.24 |
| 8,315,792 B2 | 11/2012 | Speier et al. | |
| 8,681,022 B2 | 3/2014 | Beyeler et al. | |
| 9,304,007 B2 * | 4/2016 | Gearhart | G01C 21/343 |
| 2002/0128767 A1 | 9/2002 | Cardno et al. | |
| 2002/0128772 A1 * | 9/2002 | Polidi | G01C 21/3415 |
| | | | 701/438 |
| 2002/0152020 A1 * | 10/2002 | Seibel | G01C 21/3453 |
| | | | 701/533 |
| 2005/0096840 A1 | 5/2005 | Simske | |
| 2005/0177303 A1 | 8/2005 | Han | |
| 2005/0182518 A1 | 8/2005 | Karlsson | |
| 2006/0111834 A1 | 5/2006 | Bouget et al. | |
| 2006/0184317 A1 | 8/2006 | Asahara et al. | |
| 2006/0229807 A1 | 10/2006 | Sheha et al. | |
| 2007/0027628 A1 | 2/2007 | Geelen | |
| 2012/0197524 A1 | 8/2012 | Beyeler et al. | |
| 2016/0178384 A1 * | 6/2016 | Gearhart | G01C 21/343 |
| | | | 701/410 |

\* cited by examiner

DRIVING DIRECTIONS FROM 1655 BLAKE ST, DENVER, COLORADO 80202 TO
LOS ANGELES, CALIFORNIA / MAPQUEST

MAPQUEST

TRIP TO:
LOS ANGELES, CA
1017.67 MILES / 15 HOURS 16 MINUTES

SYSTEMS AND METHODS FOR PROVIDING MAPPING SERVICES INCLUDING ROUTE BREAK POINT RECOMMENDATIONS

CROSS-REFERENCE TO RELATED APPLICATION(S)

This application is a continuation of U.S. patent application Ser. No. 13/966,047, filed Aug. 13, 2013, the entirety of which is incorporated herein by reference.

TECHNICAL FIELD

Various embodiments of the present disclosure relate generally to providing geographical mapping information and recommendations. More specifically, exemplary embodiments of the present disclosure relate to systems and methods for providing user customizable break point recommendations for a trip, based in part on user input.

BACKGROUND

Recently, the use of electronic maps has become widespread on in-vehicle or portable GPS devices, applications on mobile devices, or other devices. Such electronic maps often convey information about roads, traffic, buildings, landmarks, terrain, etc., related to geographical regions of interest. Some electronic maps may be interactive, allowing users, for example, to view a map of a particular location (e.g., specific address, city, state, country, etc.) and the surrounding locations. A user may also use the map to receive route information to a particular address, either when stationary or while travelling, by various GPS or other location detecting means.

Interactive maps may also provide information about various points of interest (POIs) at or near a location selected or specified by a user. A POI may be, for example, a specific business, destination, or attraction that is useful or interesting to an individual or a group of individuals, or that the individual or the group may want to visit. By way of example, POIs on a map display may represent gas stations, rest areas, hotels, restaurants, museums, hospitals, historical sites in a specific geographic area, houses for sale, etc. A POI may also correspond to a movie theater showing a particular film, a restaurant that serves a specific type of food, such as pizza, etc.

Electronic maps, either interactive or non-interactive, may be used for planning or taking regular trips to the same location (e.g., daily commuting from home to work), new short-distance trips to unfamiliar locations, long-distance vacation road-trips, or any other type of travel. While on a trip, such as a road-trip, many people take breaks to use rest areas, re-fuel, eat, etc. Although the routes for such trips are often planned out in advance, for example, using the above-mentioned electronic mapping services, the breaks often are not planned out. This often leads to breaks taking place locations that may not be the best suited for a particular traveler, for example, not in accordance with a user's POI preferences, resulting in an unsatisfactory trip, wasted travel time, and increased fuel consumption.

Accordingly, a need exists for systems and methods for providing user-customizable break point information, based, in part, on user inputs. In addition, a need exists for systems enabling users to quickly and easily add POIs to their trip at suggested break points, thereby easing trip planning. In addition, a need exists for systems that provide suggested travel break points based on route leg time/distance, POI density, and/or user travel break preferences.

SUMMARY OF THE DISCLOSURE

According to certain embodiments, computer-implemented methods are disclosed for providing to a user geographical mapping information relating to a trip from a start location to a destination. One method includes receiving, from a user's electronic device and over a network, user input data including at least the destination location and a break point parameter; calculating one or more routes from the start location to the destination location, based on the user input data; identifying one or more intermediate break point locations along the one or more routes based on the break point parameter received from the user; identifying a range extending around each intermediate break point location, the range defining a segment of the route about the respective intermediate break point location and including one or more potential break points; evaluating a density or type of points of interest within each potential break point within each segment of the route; determining a recommended break point from each of the potential break points for each segment of the route based on the evaluation of the density or type of points of interest; and displaying the one or more routes and the one or more recommended potential break points on the user's electronic device.

Various embodiments of the method may include one or more of the following features: the break point parameter received from the user includes one or more of: a maximum preferred driving leg time, a maximum preferred driving leg distance, a vehicle fuel range, and a vehicle battery range, the user break point parameter is received periodically throughout the trip, the step of calculating comprises accessing mapping data related to each of the one or more routes from at least one database, the step of calculating comprises determining total travel time and total travel distance of the one or more routes, wherein the step of identifying one or more intermediate break point locations further comprises determining a total number of break points, wherein the range extending around each intermediate break point location is a physical distance, the range extending around each intermediate break point location is a travel time, determining the location of the user, and the one or more potential break points are exits on a highway According to another embodiment, systems are provided for providing to a user geographical mapping information relating to a trip from a start location to a destination. Certain systems may include: a data storage device storing instructions for causing computer servers or mobile devices to provide to a user geographical mapping information relating to a trip from a start location to a destination, and a processing device configured to execute the instructions to perform a method of: receiving, from a user's electronic device and over a network, user input data including at least the destination location and a break point parameter; calculating one or more routes from the start location to the destination location, based on the user input data, identifying one or more intermediate break point locations along the one or more routes based on the break point parameter received from the user; identifying a range extending around each intermediate break point location, the range defining a segment of the route about the respective intermediate break point location and including one or more potential break points; evaluating a density or type of points of interest within each potential break point within each segment of the route, determining a recommended break point from each of the potential break points for each segment of the route based on the evaluation of the density or type of points of interest; and displaying the one or more routes and the one or more recommended potential break points on the user's electronic device.

According to certain embodiments, a computer-readable medium is disclosed storing instructions that, when executed by a processor, cause the processor to provide geographical mapping information to a user relating to a trip from a start location to a destination, the method may include: receiving, from a user's electronic device and over a network, user input data including at least the destination location and a break point parameter, calculating one or more routes from the start location to the destination location, based on the user input data, identifying one or more intermediate break point locations along the one or more routes based on the break point parameter received from the user; identifying a range extending around each intermediate break point location, the range defining a segment of the route about the respective intermediate break point location and including one or more potential break points; evaluating a density or type of points of interest within each potential break point within each segment of the route; determining a recommended break point from each of the potential break points for each segment of the route based on the evaluation of the density or type of points of interest; and displaying the one or more routes and the one or more recommended potential break points on the user's electronic device.

The disclosed embodiments allow users to quickly and easily add points of interest (POI) to their trip at suggested travel breaks—making trip planning convenient for the user. In addition, the disclosed embodiments provide suggested travel breaks based on route leg time/distance and POI density and use user travel break preferences.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems for determining and electronically presenting routing information, including optimal break point information to users, based in part on user input to an electronic mapping device. For example, routing and break point information may be determined by processing, using a processing device, an Individual user's preferences, identifying and recommending one or more break points that satisfy the user's preferences, and presenting these recommendations to users on electronic mapping devices for use during a trip.

Figure 1A:
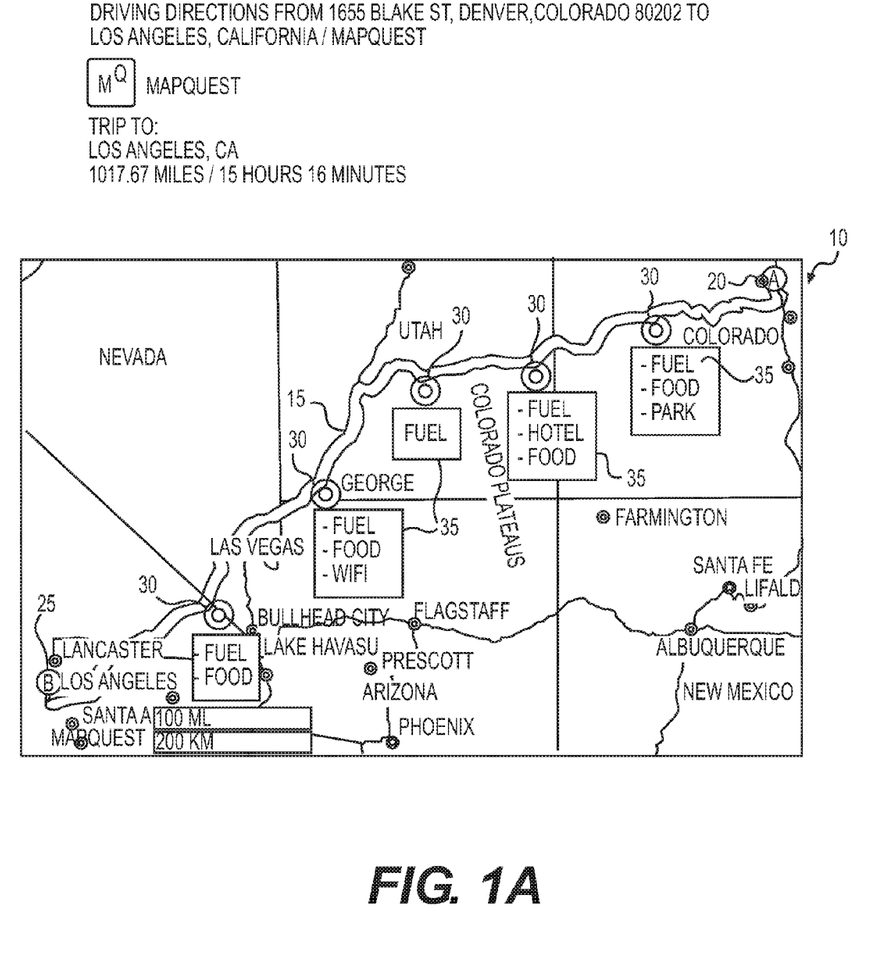
FIG. 1A is a diagram illustrating recommended break points along an electronic presentation of a mapping route.

Referring now to the figures, FIG. 1A is a diagram illustrating break points along a route presentation 10 generated by processors of electronic mapping devices based on inputs received by a user. Specifically, FIG. 1A depicts a map with a recommended route presentation 10 showing at least one route for a trip, such as route 15 from a start location 20, such as location A, to a destination location 25, such as location B. The start location 20 and the destination location 25 may be any locations identifiable on a map, such as having a street address or identifiable latitude and longitude coordinates. For example, either or both of start location 20 and destination location 25 may be a street address, intersection, landmark, transit location, location within a building, location within a park, location within a body of water, location in the air, or any other identifiable location.

Route(s) 15 may be any route from the start location 20 to the destination location 25. The route(s) 15 may be navigable by any mode of transport, such as by foot, human powered vehicle, electric or fuel powered vehicle, e.g., via road, water, air, or any other suitable means. For example, the route(s) may be between a commuter's home and workplace, between a user's home and a vacation or tourist destination, or any other travel origins or destinations. In one embodiment, the recommended route may be determined by the electronic device or a server in communication with the electronic device, the presentation of which, may show a single route 15 from start location 20 to destination location 25. The single route 15 may be a best (shortest or fastest) recommended route or a user preferred route. In other examples, the route presentation 10 may display multiple optional or alternative routes, based on various calculations by the electronic device. In addition, while route presentation 10 may display one start location 20 and one destination location 25, route presentation 10 may alternatively display multiple start locations 20 and multiple destination locations 25.

The one or more routes 15 may be displayed in a distinguishing manner relative to each other and other roads either by different colors, different patterns, different shades, via differing animations (e.g., flashing, moving feature, or any other animation), or any other graphically distinguishing manner. The route presentation 10 may provide real-time or live information, such as traffic, weather, and event information. For example, the route 15 may change in color, shade, animation, etc., to signify slow traffic conditions or any other relevant information relating to the route. The route presentation 10 also may include geographic and map information, such as airports, stadiums, schools, landmarks, such as monuments, mountains, etc., geographic information (e.g., countries, states, counties, cites, roads, rivers, lakes, etc.,) and any other relevant information that a user may select to be displayed using any suitable means.

The route presentation 10 also may be manipulated (e.g., zoomed in and out, scrolled across, etc.), and also may be interactive, either by using a keyboard, touch-screen, mouse, or any other user input. For example, the route presentation 10 may include one or more user-selectable portions that, when selected, may present additional and/or more detailed information associated with the user-selectable portion of the diagram 10.

The route presentation 10 may include one or more recommended break points 30 along the route 15. Each of the recommended break points 30 may include a summary 35 including information regarding one or more points of interest (POIs) such as fuel services, rest rooms, restaurants, recreation (e.g., parks, gym, scenic overlooks, landmarks, etc.), wireless internet services (Wi-Fi), hotels, etc. The recommended break point summary 35 may further be selectable to retrieve further information regarding specific a specific POI, e.g., other user ratings for a restaurant at the recommended break point 30.

In one embodiment, the recommended break points 30 may be identified by first determining a suitable number of intermediate break points along the route, and estimating the location of intermediate break points along the route. Based on the user input, the electronic device or server may determine recommendations for break points around the intermediate break points.

Figure 1B:
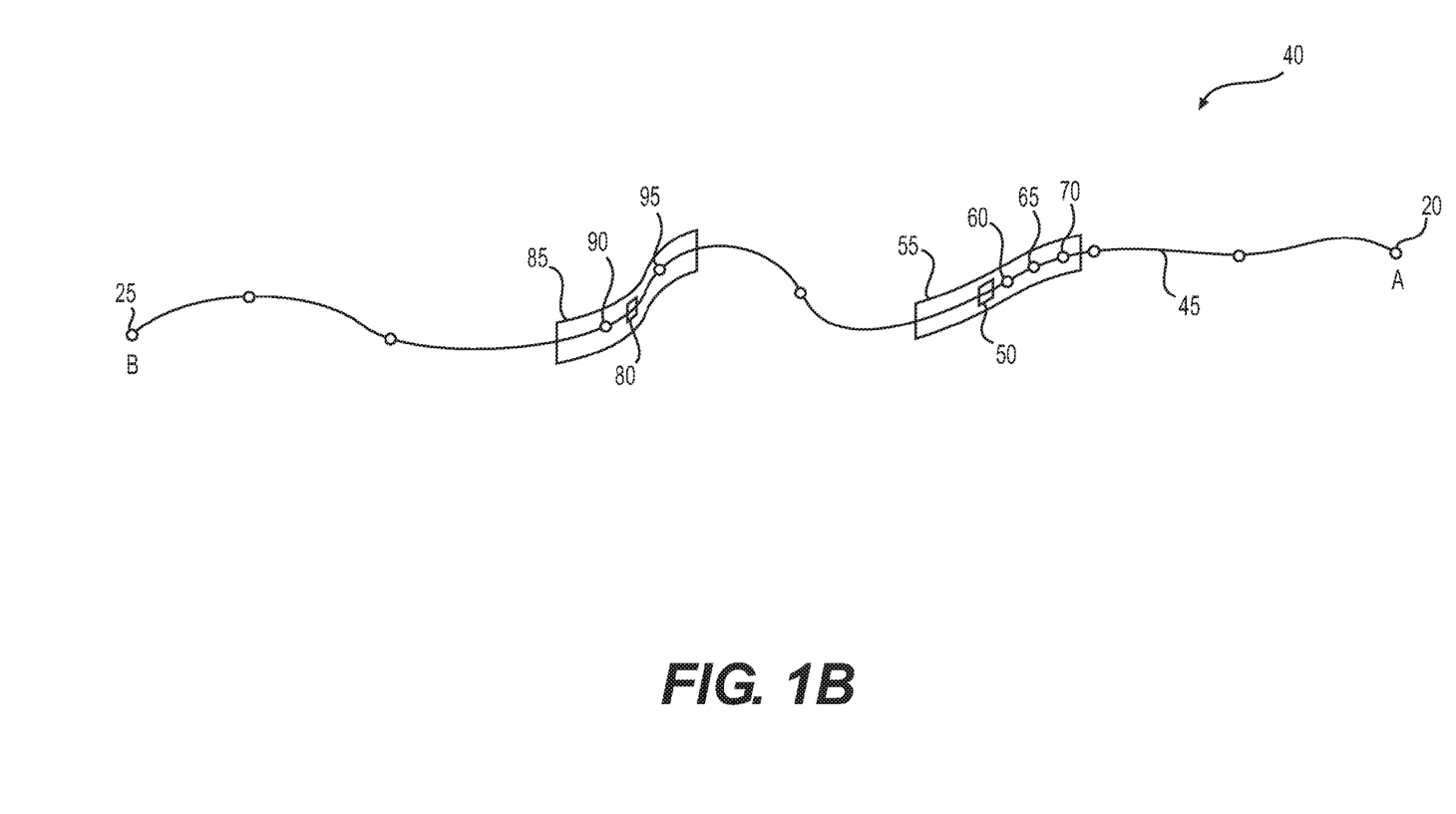
FIG. 1B is a diagram illustrating detailed mapping information for intermediate and potential break points along an electronic presentation of a mapping route, according to an exemplary embodiment of the present disclosure.

FIG. 1B shows detailed mapping information 40 for intermediate break points 50 and 80 along a route between a start location A, 20 and a destination location B, 25. Each intermediate break point 50 and 80 may be determined based on dividing the total route, (e.g., based on total travel time and/or total travel distance) by a calculated number of break points. The intermediate break points may be any location along the route, regardless of the presence of POIs or exits. Alternatively, an intermediate break point may be a mile marker along a highway or an exit on a highway. The methods of this disclosure may include generating for each calculated intermediate break point 50 and 80, a respective range 55 and 85. The range may be a distance or time range, the midpoint of which may be the respective intermediate break point 50 and 80. The length of the range may be pre-set and the position of the range may be computer-generated by the electronic device or may be set by the user, and may be the same or different for each intermediate break point 50 and 80. Each range 55 and 85 may represent a segment along the route between the start location and destination location and may include one or more potential break points 60, 65, 70, 90 and 95 within each range 55 and 85. As will be explained in greater detail, the recommended break point 30 may be selected from one of the potential break points in the range, based on user input and density and/or type of point of interest(s). Each route may have any number of intermediate break points and each intermediate break point may have any number of potential break points within a corresponding range.

As will be discussed with respect to FIG. 2, the route presentation 10 may be displayed on any electronic device 110, such as a mobile device 115, portable navigation system 120, computer 120 or 125, in-vehicle navigation system 130, or electronic kiosk, and/or it may be printed, or electronically displayed through any other suitable manner. The route presentation 10 may be any suitable size for visualization by a user. When displayed on an electronic device 110, the route presentation 10 may be manipulated, for example, the route presentation may be zoomed in and/or out, scrolled across, rotated, etc., in any suitable manner, such as by selecting (e.g., clicking an icon, using a touch screen, etc.) a portion of the route presentation 10 to manipulate. For example, an icon for a recommended break point 30 may be selected and information, such as POI information 40 may be displayed. In addition, the user may input information using any input means of the electronic device 115.

Figure 2:
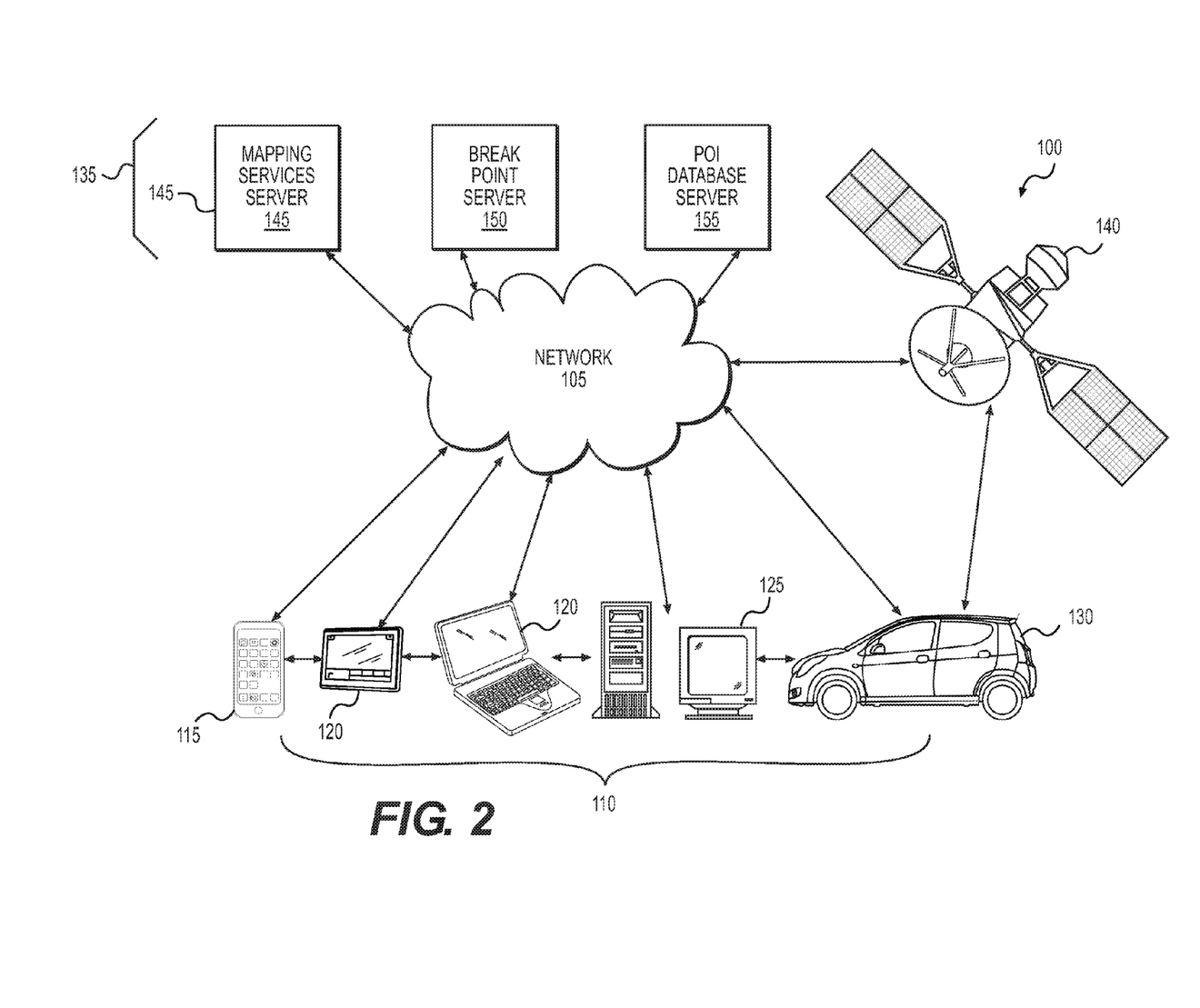
FIG. 2 is a block diagram of a communications system configured to present users with automatically generated routes between a start location and a destination location and break point information, according to an exemplary embodiment of the present disclosure.

FIG. 2 is a block diagram of a communications system 100 capable of presenting routes and route information for a trip, between at least two points, for example, along a route between start locations 20 and destination locations 25 via a network 105, such as the Internet, to one or more electronic devices 110, such as a mobile device 115 (e.g., mobile phone, personal digital assistant, tablet computer), a GPS device 120, a computer 120, 125, in-vehicle navigation system 130, and/or any device connected to a network 105 such as the Internet, according to an exemplary embodiment of the present disclosure.

The electronic device 110 may include an application, such as a mobile application, configured to process and execute instructions and save data in memory. The mobile application may be configured to provide information, such as location information to a server 135 such as a mapping services server 145, break point server 150, and/or POI database server 155 for processing by a processor and the processed information may be communicated by the server 135 to the electronic device 110 via the network 105 for display to the user.

For example, the location information of the electronic device 110 (e.g., address, map coordinates, compass directions, etc.), may be determined by the server 135 by any suitable method. For example, a location of an electronic device 110 may be determined by receiving a user input via the electronic device 110, via global positioning information from the electronic device 110 via a satellite 140 and network 105, via cellular tower locations (e.g., receiving, from the electronic device 110, information regarding which cellular towers it is currently in communication with), from a GPS device 120, and/or via Wi-Fi locations (e.g., receiving, from the electronic device 110, information regarding which Wi-Fi locations and/or the Internet Protocol (IP) addresses it is using) or any other suitable manner.

Various electronic devices 110 may also communicate with each other by any suitable means (e.g., via the Internet, Bluetooth, Near Field Communication, or any other suitable means) to send and receive location and other information. For example, a mobile device 115 may communicate with a GPS device 120, 130 in communication with a satellite 140.

The electronic device 110 may receive information regarding a user's trip, such as a start location 20, travel route, and destination location 25 and may communicate this information to a server 135 that may have a processor, memory, and user input. The server 135 may save the information in memory, such as a computer readable memory. The electronic device 110 may access (e.g., retrieve) the information from the memory of the server 135, such as a break point application server 150, via the network 105 using the application, such as a mobile application stored in the memory of the electronic device 110. The mobile application may be initially downloaded by the electronic device 110 via the network 105 and saved in the memory of the electronic device 110. The mobile application may be any machine readable code for executing instructions, such as software, configured to be processed by the electronic device 110.

The electronic device 110 also may be in communication with one or more external servers, such as mapping services server 145, break point server 150, and POI database server 155 via, for example, the network 105, and/or others of the servers 135. The external servers 145, 150, 155 may be any source of routing and/or mapping information. In addition, the mapping services server 145 may include data from other users, traffic reports, weather reports, police reports, and/or any other source of relevant information and the POI database server 155 may include reviews of POIs, details about POIs and/or any other relevant information. The mapping services server 135 may receive information from the other servers 150, 155 and process the information for display on the electronic device 110. The processed information may be communicated to the break point server 150 on the electronic device 110, via the network 105. The application may cause the processed information to be saved and/or displayed on the electronic device 110.

Figure 3:
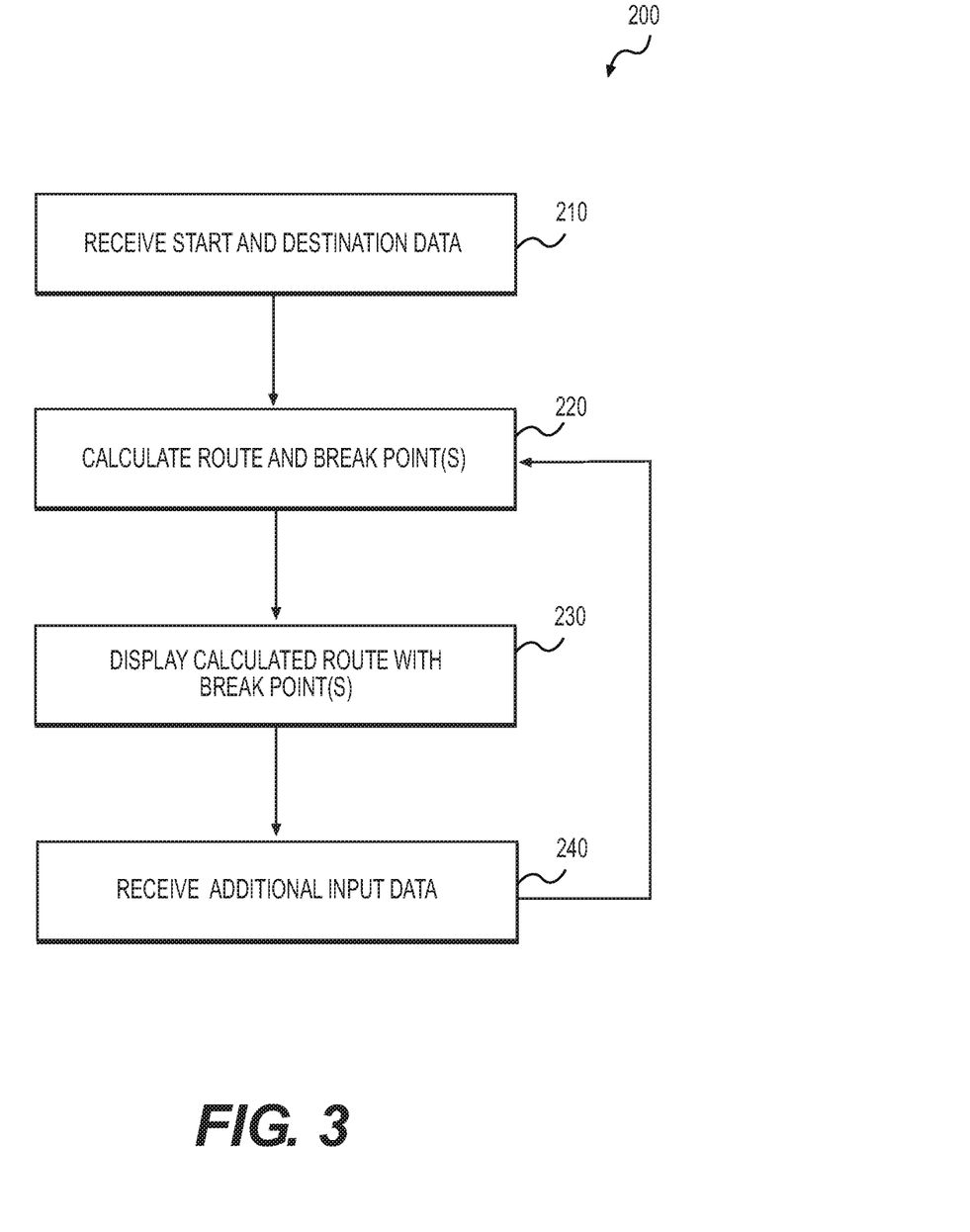
FIG. 3 is a flow diagram of an exemplary method of automatically generating and providing to a user route and break point information for a route between a start location and a destination location, according to an exemplary embodiment of the present disclosure.

FIG. 3 is a flow diagram of an exemplary method of providing route and break point information to a user, according to an exemplary embodiment of the present disclosure. The method 300 may be used for providing a recommended route, and for providing recommended break points along the recommended route. As described above with respect to FIG. 2, method 300 may be performed by any component or combination of server(s) 135, satellites 140, and/or electronic devices 110.

In one embodiment, method 200 may include receiving input data from a user's electronic device 110, at step 210, such as start and destination locations and break point preferences. For example, the user may input a preference for receiving break point locations that are close to electric car charging stations, close to diesel fueling stations, avoiding rest areas, close to cities, etc., or any other relevant input data that may be used in generating a recommended route and recommended break point information. The user may designate the list or preferences as a user preferred type of travel which may be saved in memory and be retrievable for subsequent travel. For example, the user may designate a first type of travel as "For Work" and may input preferences for break point locations having Wi-Fi providers, and a second type of travel as "With Family" and may input preferences for break point locations with parks, and other POIs preferences. The electronic device 110 may prompt the user to select any of the saved types of travel and may calculate recommended routes and/or break points based on the saved preferences for type of travel. The user input data may be stored in memory for retrieval and processing at any time.

Based on the user input data received at step 210, the method may include processing the input data, for example, using a processor of a computer server, to calculate one or more recommended routes and/or one or more break points along the recommended routes. The calculations of the recommended routes and/or recommended break points may be accomplished using any suitable manner, for example, the method described in further detail below in reference to FIG. 4. Following the calculation of the recommended route(s) and/or the recommended break point(s), the method may include a step of displaying the results of the calculations to the user. The display may be on any electronic device 110 or may be printed using a printer or any other suitable manner. At any time during the method, the user may input any additional information at step 240, which may be processed to update and/or adjust the calculations, and the updated results of the calculation may be displayed at step 230.

For example, at step 210, the user may input the start and destination locations, and the recommended route(s) and/or break point(s) may be calculated at step 220. The results of the calculations at step 220 may displayed for the user at step 230, and the user may then input preferences regarding break points, e.g., a preference for break point locations within 0.1 miles of a free Wi-Fi provider. The routes and break points may then be re-calculated in view of the additional user input and the displayed results may be updated. The user may be prompted for additional input data by the display device at any time during the method 200.

In addition, the electronic device may detect, using GPS or any other suitable manner, the actual location of the user during the route and dynamically adjust the route and break point information in real-time. For example, the electronic device 110 may detect the location of the user during travel and determine that a break in travel has been taken that is different from any of the recommended break points. Based on the break in travel, the electronic device 110 may re-calculate the route and break points and display updated adjusted recommended route(s) and break point information in accordance with any user information previously provided and saved in memory. In addition, during travel, the recommended route(s) and break points may be re-calculated and updated based on additional user input. For example, during the trip, if the user inputs a preference to locate a break point location within a five minute drive time that has a public restroom, the electronic device 110 may re-calculate and provide a recommended break point, in addition the route and subsequent recommended break points may be updated and the results displayed.

As discussed above and now discussed in detail, FIG. 4 shows an example of a method 300 of calculating recommended travel route(s) and/or a break point(s) based on user input by an electronic device 110 and/or servers 135. At step 310, a recommended route between the user provided start and destination locations may be calculated by the electronic device 110. The user may enter a specific address for each location, such as a street address or a POI (e.g., JFK Airport) or a general geographic location, (e.g., Denver, Colo.) or any previously saved location (e.g., home, work, etc.) The electronic device may receive and save the addresses and then calculate one or more routes based on the location information received from the user and any other user inputted information regarding the route, such as driving preferences (e.g., scenic routes, avoid toll-ways, etc.), type or vehicle (e.g., car, motorcycle, large truck, bicycle, etc.) For example, the electronic device, may communicate with a mapping services database server 145 to retrieve and process information in accordance with the user input to determine the one or more routes. The route(s) may include a route generated by one or more mapping algorithms, such as, for example, mapping algorithms generated by a mapping services server 145, generated by the electronic device 110, or any other algorithms generated by any other means accessible by the electronic device 110. The mapping algorithms may be based on various factors, such as shortest distance, fastest travel time, least traffic lights, most scenic route, best route for car, RVs, large trucks (e.g., avoiding short bridges, tunnels, or narrow roads), motorcycles, or any other type of vehicle, any user trip preferences determined by user inputted travel preferences, either current or previously saved in memory, or any other factors or combination of factors, and may be adjusted by the user.

Figure 4:
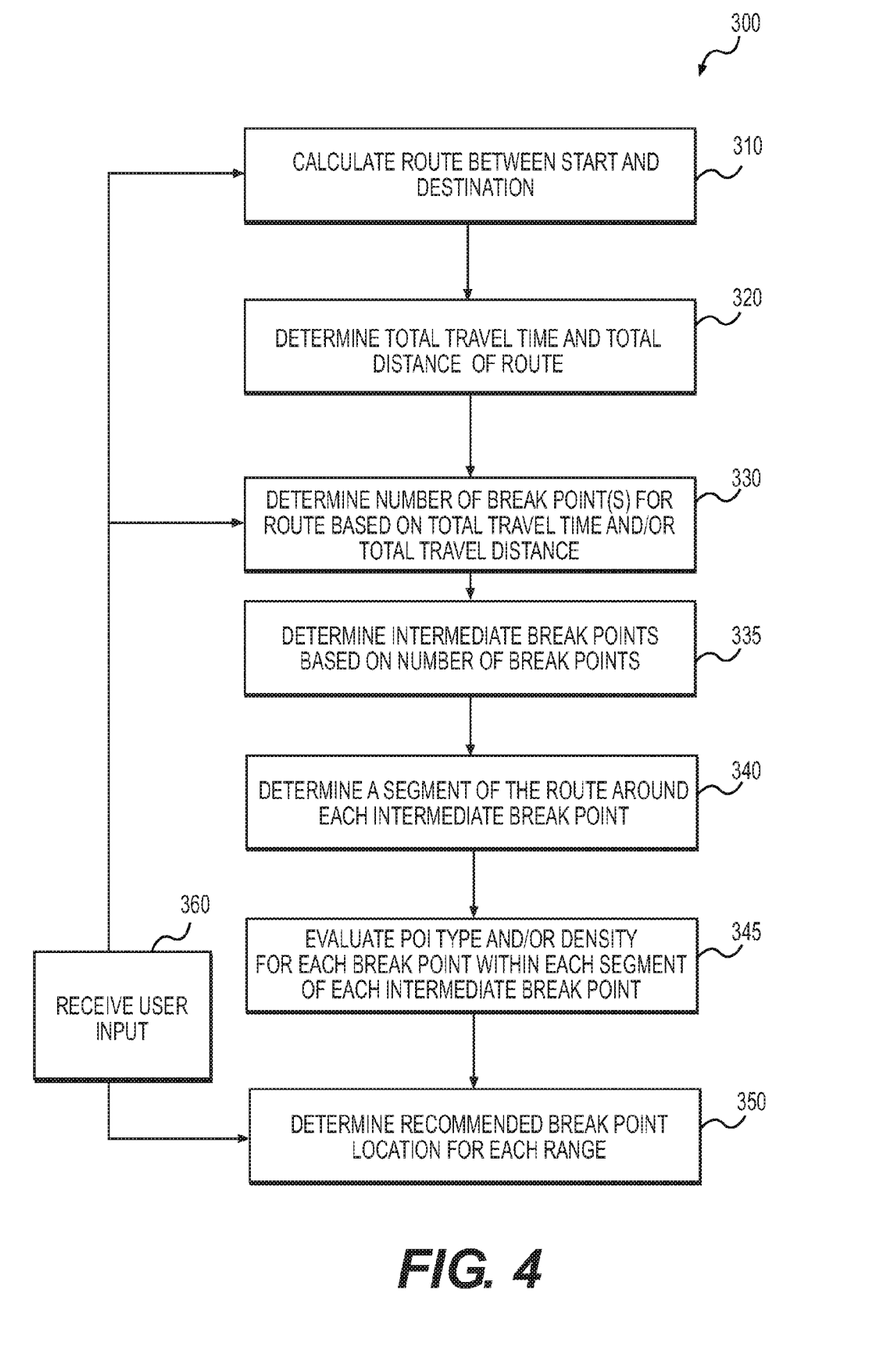
FIG. 4 is a flow diagram of an exemplary method of calculating a route and determining break point information, according to an exemplary embodiment of the present disclosure.

Based on the user information and/or any other relevant information, such as traffic information, weather information, event information retrieved from any databases, such as a mapping database server 145, an optimal route or routes may be calculated and saved in memory. The route(s) calculated at step 310 may be presented to the user via the electronic device 110 and/or may be saved in memory for any adjustment based on any other user inputs prior to presentation to the user.

At step 320, based on the calculation at step 310, the total travel time and total travel distance for the route(s) may be calculated. The calculations of total travel time and/or total distance of the route(s) may be calculated based on mapping algorithms generated by a mapping services server 145, generated by the electronic device 110, or any other algorithms generated by any other means accessible by the electronic device 110. The mapping algorithms may be based on various factors, such as time of travel, traffic information, type of vehicle, speed limits, number of traffic lights, etc.

At step 330, the number of break points may be calculated by the electronic device based on the total travel time and the total travel distance calculated at step 320. The number of break points may be calculated by the electronic device based on the results of step 320, using any suitable formula or algorithm, and also may be based on user input data. For example, the user may indicate that the calculation be based on a minimum number of break points, and in another example, the user may indicate that any number or break points may be taken. The electronic device may determine a pre-set suitable number of break points for a particular increment of time and/or distance, (e.g., every 2.5 hours, or every 150 miles).

In one example, the electronic device may set a range for the number of break points based on an average of a maximum number of break points and a minimum number of break points, and/or based on an average of a time-based calculation of break points and a distance-based calculation of break points. In one embodiment, the maximum number of break points may be based on a predetermined time increment (e.g., the amount to travel time before a break), dividing the total estimated travel time by the predetermined time increment and subtracting 1 to obtain the number of travel breaks. For example, if a route has a total travel time of 15 hours, and the predetermined time increment is 2.5 hours (or some other recommended maximum driving time), then the total trip may be divided into about 6 travel segments, which means the trip would involve about 5 travel breaks, or "break points" (since the number of break points is typically one fewer than the number of segments).

Alternatively, or additionally, the minimum number of break points determined by the electronic device may be based on the distance the vehicle may travel just before all of the vehicle's full fuel capacity is consumed (e.g., based on the average speed, fuel (gas, electric charge, etc.) capacity, and/or miles per gallon/charge data for a specific vehicle). For example, the electronic device may calculate that a vehicle may have a gas tank capacity or current contents of 17 gallons, and an average miles per gallon of about 25. The determination of vehicle information by the electronic device 110 may be automated by communicating with the electronic computer of the vehicle. Thus, the electronic device 110 may calculate, or receive from the vehicle's electronic computer, the number of miles the vehicle may travel on the available fuel (i.e., the range of the vehicle), in this case, about 425 miles. For a route having a total distance of 1020 miles, the total distance of 1020 miles may be divided by the 425 mile range to result in an estimate of about 3 segments of the trip, and therefore, 2 travel breaks. The electronic device may then average the calculated estimated number of break points of 5 and 2 and determine that the trip should have about 3 or 4 break points. The electronic device may average the calculated break points on the basis of their status as the maximum and minimum number of recommended break points, or on the basis of their status as being time-based and distance-based. In one embodiment, the break points may be calculated The electronic device may further process the route information to identify intermediate break points. The electronic device 110 may accomplish this by dividing the route by the number of break points determined in step 330 to obtain an intermediate break point location for each of a plurality of intermediate break points. For example, if the total distance of the route is about 1020 miles, the break points may be estimated to occur every 204 miles (i.e., 1020 miles divided by 5). The intermediate break point may be any location along the route.

A computer implemented application on the electronic device may automatically generate the location of each intermediate break point 50 and 80 by dividing the route by the number of break points determined in step 330 as discussed above. In addition, the electronic device may generate further route information relating to determining recommended break point(s). For example, a time or distance range 55 and 85 may be set by the electronic device 110 for each estimated intermediate break point 50 and 80 using any suitable manner, such as any suitable pre-set distance or any pre-set amount of travel time. Referring to the above example in which the estimated break point occurs every 204 miles, the range for a first estimated intermediate break point 50 may be pre-set by the electronic device at plus or minus 5 miles, such that the range 55 for the first estimated intermediate break point 50 is 199 miles to 209 miles from the origin. The range 55, 85 for each estimated intermediate break point 50, 80 also may be inputted into the electronic device 110 by the user based on any suitable measurement, e.g., time, distance, within the parameters calculated in step 320 and may be the same or different for each intermediate break point 50 and 80.

At step 350, the electronic device may then search for potential break point locations 60, 65, 70, 90, and 95 within each range 55 and 85 based on the user input using one or more databases, such as a break point server 150, mapping services server 145, and/or POI database server 155. For example, the potential break points may be exits along a highway. In one embodiment, given the route leg time and distance, the system may perform a linear interpolation to find the time and distance segment sizes based on lower/upper bounds. These calculated break point locations may snap to a location with desirable POI density within a determined range. The lower segment time may be approximately 2 hours and the upper segment distance may be less than a distance travelable using a typical tank of gas. The time segment count may be found by dividing the route leg time by the calculated segment time. The distance segment count may be found by dividing the route leg distance by the calculated segment distance. The number of route leg divisions may be the average of the time segment count and the distance segment count. In one embodiment, the segment size may be calculated with respect to the size of the route leg, where the lower and upper bounds are in place so that the segment size remains valid for the intent of the suggested travel breaks. In one embodiment, the user may specify the number of divisions per route leg, and/or specify the time/distance of each segment. Similar snapping logic may be used for each time/distance travel break.

In one embodiment, the potential break points or locations with sufficient POI density may be exits along a highway. The POI density based on any input data may be calculated and recommendations for break point locations 60, 65, 70, 90, and 95 within each range 55 and 85 of each estimated break point 50 and 80 may be determined by the electronic device at step 350 based on the POI density, other user inputs, and any other relevant information. For example, the electronic device 110 may determine one of the potential break points 60, 95, 70, 90, 95 for within each of the break ranges 55 and 85 having the highest density of POI's per the user input data is at a particular location, such as an particular exit on a highway, and that location may be displayed as a recommended break point 30 along the route for each estimated break point 50 and 80.

At any point during the method 300, the calculations may be adjusted or refreshed by the electronic device 110 with or without user input data 360. For example, the electronic device may adjust the route based on traffic information received from the mapping services server 145 or based on a change in a user break point preferences, for example, instead of a previously indicated preference for a break point location having an Italian restaurant, the user may indicate a preference for a break point location having a restaurant serving sushi. Further, at step 360, the user may indicate or select, from a list of pre-populated options or user inputted preferences, preferences for POI's or other preferences for each of the one or more break points, using the electronic device 110.

The user preferences for each of the break points may be the same or different. For example, on the electronic device 110, the user may indicate or select a preference for each break point to have a gourmet coffee shop and for the last break point to be close to a hotel.

The POI information including the POI density may be generated using any suitable means, for example, accessing mapping services databases and/or any other suitable manner. For example, POI database server 155 may contain address information, latitude/longitude information, ID numbers, website addresses, descriptive information, and/or other information about various POIs within a break point travel range. The break point server 150, mapping service server 145 and POI database server 155 may all communicate via the network 105 to access and retrieve user input data such as break point preferences to optimize break point location recommendations. The break point server 150 may also include optimization criteria that may be used to locate POIs and/or POI information. The optimization criteria may include user preferences, predetermined thresholds, density parameters, reference locations, and/or other information that may be used to provide POIs and/or POI information.

The POIs associated with each break point range based on user input data may be assigned different weights to calculate the ranks, for example, based on criteria provided by a user, quality of POIs that may be determined based on information gathered from public sources (e.g., quality of restaurant, cleanliness of rest area, pet friendly location, healthy food options, or price of gas), types of POIs requested by a user, and/or any other relevant factors.

A POI density for each range within an intermediate break point may be calculated by determining the number of POIs matching the user's input preferences, and/or other factors. The POIs also may be ranked based on various factors, such as distance from each other. Additional factors, such as safety of the location, reviews of POIs retrieved from public sources, service area time of restaurants, diversity of POIs (e.g., repair shops, restaurants, gas stations, shopping malls, and other commercial locations) within one group, accessibility from major freeways, traffic conditions, and/or other suitable factors, may be used to rank the potential break point locations.

Example 1

A user planning a trip from Denver, Colo. to Los Angeles, Calif. uses a mobile phone to input the start (Denver) and destination (LA) locations and is prompted by the electronic device to enter preferred departure time, and any preferences for break point locations. The user inputs, via a touch screen of the electronic device, that the user departure time will be set to the present time, and that the break points should be in close proximity to numerous POIs, including scenic landmarks, and also in close proximity to gourmet coffee shops. The electronic device may prompt the user to determine if the preferences indicated should be saved as a user preferred travel type and the user may indicate "Yes" and name the saved travel type "scenic+coffee," for later retrieval. The electronic device may retrieve previously saved information regarding the user's vehicle (e.g., miles per gallon and fuel tank capacity) and communicate with the vehicle (e.g., via the vehicle's computer) to obtain present fuel levels. The electronic device may then calculate a route and break points along the route that meets the preferences of the user based on the Inputted data and displays the results on the electronic device by showing the route on a map and the break points along the map along with information regarding the POIs associated with the break points.

For example, the vehicle may have a fuel tank capacity of 15 gallons and average 25 miles per gallon. The distance between Denver and LA may be about 1020 miles and the total travel time may be about 15 hours. The electronic device may set a pre-determined or default travel time segment to be 2.5 hours, and based on this default travel time segment, may calculate the upper bound to be about 5 break points ((15 hours/2.5 hours)−1). The lower bound may be calculated to be about 375 miles (15 gallons×25 miles per gallon) and ((1020/375)−1) to equal about 2 break points (rounding up and assuming the route is started with a full tank of fuel). These upper and lower bounds may be averaged ((5+2)/2) to about 3.5, rounded up to 4 break points. The electronic device may divide the total travel distance by the number of break points resulting in a measurement of an intermediate break point about every 255 miles. The electronic device may locate potential break point locations within a predetermined range or segment surrounding or otherwise relative to the calculated intermediate break point, and determine a recommendation for a break point from the potential break points based on the user input data and any POI data or preferences.

The user may begin travelling along the route and decide to take a break prior to a first recommended break point. At the break point, the user may re-fuel the vehicle. The electronic device may detect that the vehicle has stopped based on the vehicle location not moving for a duration of time above a pre-set threshold (e.g. 7 minutes) and other vehicle information via communication with the vehicle computer system (e.g., the engine of is off, the doors have been opened) and may detect fuel levels. Based on the detection that the vehicle has stopped and re-fueled to a full fuel tank capacity, the electronic device may prompt the user to indicate if the travel recommendations, and/or route and break points, should be re-calculated. If the user indicates "Yes", then the electronic device may re-calculate and display updated information. The user may select one of the break points using the electronic device to obtain further information regarding the POI associated with a particular break point, for example, may click on restaurants associated with a break point and read reviews regarding the restaurant or other information, which the electronic device may retrieve from external servers via the network.

Example 2

A user may input the start and destination locations as in Example 1 and select a previous saved travel type, e.g., "with Family" with saved preferences for the break point locations having parks and hotels. The electronic device may provide recommended break points based on the user input.

Figure 5:
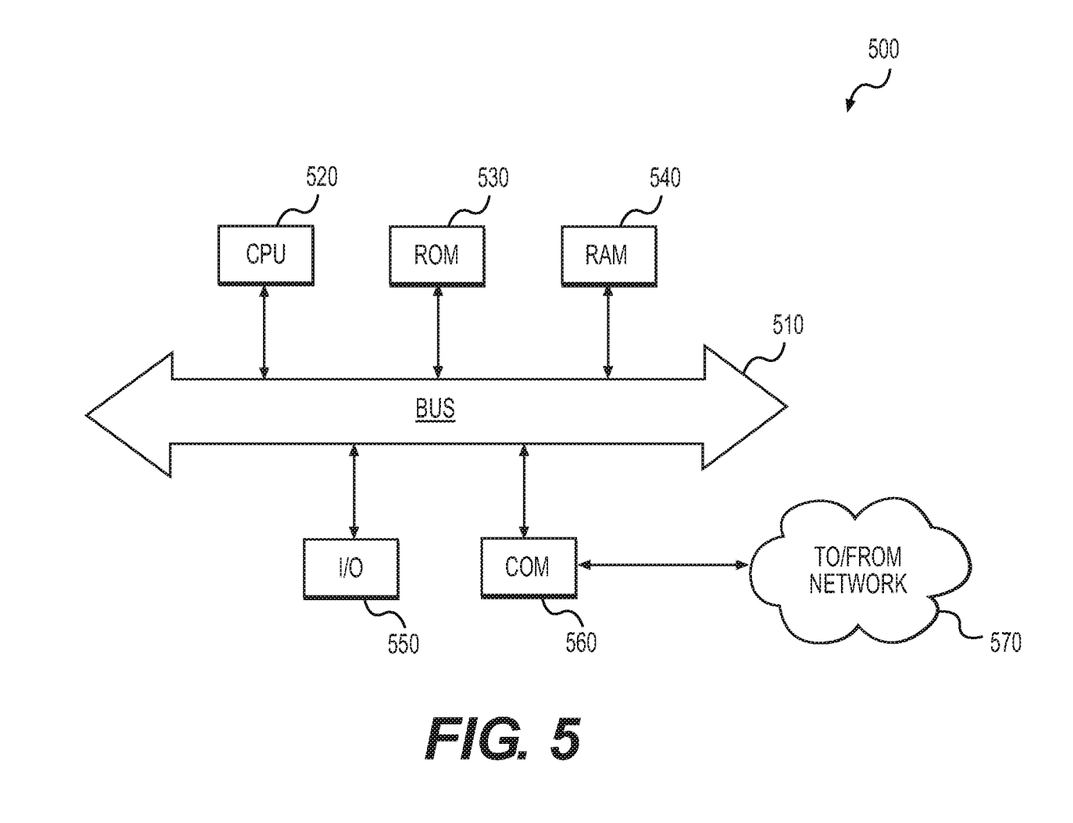
FIG. 5 is a simplified functional block diagram of a computer that may be configured as a host server, for example, to function as a break point server.

FIG. 5 provides a functional block diagram illustration of general purpose computer hardware platforms. FIG. 5 illustrates a network or host computer platform 500, as may typically be used to implement a server like the mapping services server system 135. It is believed that those skilled in the art are familiar with the structure, programming and general operation of such computer equipment and as a result the drawings should be self-explanatory.

A platform for a server or the like 500, for example, may include a data communication interface for packet data communication 560. The platform may also include a central processing unit (CPU) 520, in the form of one or more processors, for executing program instructions. The platform typically includes an internal communication bus 510, program storage and data storage for various data files to be processed and/or communicated by the platform such as ROM 530 and RAM 540, although the server 500 often receives programming and data via network communications 570. The hardware elements, operating systems and programming languages of such equipment are conventional in nature, and it is presumed that those skilled in the art are adequately familiar therewith. The server 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing to a user geographical mapping information relating to a trip from a start location to a destination location, the method including:
   receiving, from a user's electronic device and over a network, user input data including at least the destination location and a break point parameter;
   calculating one or more routes from the start location to the destination location, based on the user input data and the break point parameter;
   identifying one or more intermediate break point locations along the one or more routes based on the break point parameter received from the user;
   identifying an area, extending along the one or more routes, around each intermediate break point location and including one or more potential highway exit points;
   evaluating, for each intermediate break point location, a plurality of points of interest associated with each potential highway exit point within the area of the intermediate break point location;
   determining, for each intermediate break point location, a recommended highway exit point from among each of the one or more potential highway exit points within the area of the intermediate break point location, based on the evaluation of the plurality of points of interest; and
   displaying, on the user's electronic device, one or more routes from the start location to the destination location, the routes being divided into a plurality of segments according to the one or more recommended highway exit points.

2. The method of claim 1, wherein the break point parameter received from the user includes one or more of: a maximum preferred driving leg time, a maximum preferred driving leg distance, a vehicle fuel range, and a vehicle battery range.

3. The method of claim 2, wherein the break point parameter is received periodically throughout the trip.

4. The method of claim 1, wherein the step of calculating comprises accessing mapping data related to each of the one or more routes from at least one database.

5. The method of claim 1, wherein the step of calculating comprises determining total travel time and total travel distance of the one or more routes.

6. The method of claim 1, wherein the step of identifying one or more intermediate break point locations further comprises determining a total number of break points.

7. The method of claim 1, wherein the area extending around each intermediate break point location is defined by a physical distance.

8. The method of claim 1, wherein the area extending around each intermediate break point location is defined by a travel time.

9. The method of claim 1 further comprising a step of determining a location of the user.

10. A system for providing to a user geographical mapping information relating to a trip from a start location to a destination location, the system including:
- a data storage device storing instructions for causing computer servers or mobile devices to provide to the user the geographical mapping information relating to the trip from the start location to the destination; and
- a processing device configured to execute the instructions to perform a method of:
  - receiving, from a user's electronic device and over a network, user input data including at least the destination location and a break point parameter;
  - calculating one or more routes from the start location to the destination location, based on the user input data and the break point parameter;
  - identifying one or more intermediate break point locations along the one or more routes based on the break point parameter received from the user;
  - identifying an area extending along the one or more routes, around each intermediate break point location and including one or more potential highway exit points;
  - evaluating, for each intermediate break point location, a plurality of points of interest associated with each potential highway exit point within the area of the intermediate break point location;
  - determining, for each intermediate break point location, a recommended highway exit point from among each of the one or more potential highway exit points within the area of the intermediate break point location, based on the evaluation of the plurality of points of interest; and
  - displaying, on the user's electronic device, one or more routes from the start location to the destination location, the routes being divided into a plurality of segments according to the one or more recommended highway exit points.

11. The system of claim 10, wherein the break point parameter includes one or more of: a maximum preferred driving leg time, a maximum preferred driving leg distance, a fuel range, and a battery range.

12. The system of claim 11, wherein the break point parameter is received periodically throughout the trip.

13. The system of claim 10, wherein the step of calculating comprises accessing mapping data related to each of the one or more routes from at least one database.

14. The system of claim 10, wherein the step of calculating comprises determining total travel time and total travel distance of the one or more routes.

15. The system of claim 10, wherein the step of identifying one or more intermediate break point locations further comprises determining a total number of break points.

16. The system of claim 10, wherein the area extending around each intermediate break point location is defined by a physical distance.

17. The system of claim 16, wherein the area extending around each intermediate break point location is defined by a travel time.

18. The system of claim 10 further comprising a step of determining a location of the user.

19. A non-transitory computer-readable medium storing instructions that, when executed by a processor, cause the processor to perform a method to provide geographical mapping information to a user relating to a trip from a start location to a destination location, the method including:
- receiving, from a user's electronic device and over a network, user input data including at least the destination location and a break point parameter;
- calculating one or more routes from the start location to the destination location, based on the user input data and the break point parameter;
- identifying one or more intermediate break point locations along the one or more routes based on the break point parameter received from the user;
- identifying an area extending along the one or more routes, around each intermediate break point location and including one or more potential highway exit points;
- evaluating, for each intermediate break point location, a plurality of points of interest associated with each potential highway exit point within the area of the intermediate break point location;
- determining, for each intermediate break point location, a recommended highway exit point from among each of the one or more potential highway exit points within the area of the intermediate break point location, based on the evaluation of the plurality of points of interest; and
- displaying, on the user's electronic device, one or more routes from the start location to the destination location, the routes being divided into a plurality of segments according to the one or more recommended highway exit points.

* * * * *